United States Patent
Anderson et al.

(10) Patent No.: US 12,222,036 B2
(45) Date of Patent: Feb. 11, 2025

(54) SEALING ARRANGEMENT FOR AN ENCLOSURE

(71) Applicant: Hoffman Enclosures Inc., Anoka, MN (US)

(72) Inventors: William Anderson, Blaine, MN (US); Rony Khalife, Coon Rapids, MN (US); Joseph D. Ricke, Arden Hills, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 94 days.

(21) Appl. No.: 17/962,735

(22) Filed: Oct. 10, 2022

(65) Prior Publication Data

US 2023/0112739 A1    Apr. 13, 2023

Related U.S. Application Data

(60) Provisional application No. 63/254,010, filed on Oct. 8, 2021.

(51) Int. Cl.
  *F16J 15/10*     (2006.01)
(52) U.S. Cl.
  CPC .................. *F16J 15/104* (2013.01)
(58) Field of Classification Search
  CPC .......... E06B 7/16; E06B 7/2309; F16J 15/104
  See application file for complete search history.

(56) References Cited

U.S. PATENT DOCUMENTS

| | | | |
|---|---|---|---|
| 4,538,380 A * | 9/1985 | Colliander | E06B 7/2314 49/490.1 |
| 5,232,277 A | 8/1993 | Cassady et al. | |
| 6,128,861 A * | 10/2000 | Calamari | E06B 7/2309 49/501 |
| 6,170,928 B1 | 1/2001 | Eardley et al. | |
| 6,600,664 B2 | 7/2003 | Durr et al. | |
| 9,174,519 B2 * | 11/2015 | Murree | B60J 10/24 |
| 9,745,794 B2 | 8/2017 | Ellingson | |
| 10,196,090 B2 | 2/2019 | Ito et al. | |
| 10,537,038 B2 | 1/2020 | Reese et al. | |
| 10,638,628 B2 | 4/2020 | Yu et al. | |
| 10,779,422 B2 | 9/2020 | Wilson et al. | |
| D920,938 S | 6/2021 | Mattila et al. | |

(Continued)

FOREIGN PATENT DOCUMENTS

| CA | 2883837 C | 6/2020 |
|---|---|---|
| CN | 107370341 A | 11/2017 |

(Continued)

OTHER PUBLICATIONS

Dirak, 5-171 Radius Adapter Product Sheets, www.dirak.com, Aug. 10, 2021, 2 pages.

(Continued)

*Primary Examiner* — Eugene G Byrd
(74) *Attorney, Agent, or Firm* — Quarles & Brady LLP

(57) ABSTRACT

A sealing arrangement for an enclosure is provided. The sealing arrangement can include an offset and an open hem. The open hem can have an inner perimeter that defines an opening of the enclosure and an outer perimeter with radiused corners configured to receive a continuous gasket to seal the enclosure.

20 Claims, 8 Drawing Sheets

(56) References Cited

U.S. PATENT DOCUMENTS

| | | | | |
|---|---|---|---|---|
| 2003/0107187 | A1* | 6/2003 | Yajima | F16J 15/104 |
| | | | | 277/628 |
| 2005/0204634 | A1* | 9/2005 | Nozaki | B60J 10/74 |
| | | | | 49/441 |
| 2007/0084125 | A1* | 4/2007 | Gholap | F25D 23/087 |
| | | | | 49/478.1 |
| 2011/0036017 | A1* | 2/2011 | Moreton-Smith | B60J 10/24 |
| | | | | 49/506 |
| 2012/0153666 | A1* | 6/2012 | Mori | B60J 10/86 |
| | | | | 49/498.1 |
| 2013/0328472 | A1 | 12/2013 | Shim et al. | |
| 2014/0230337 | A1 | 8/2014 | Shim et al. | |
| 2015/0075080 | A1* | 3/2015 | Ellingson | H02B 1/28 |
| | | | | 49/489.1 |
| 2015/0076978 | A1 | 3/2015 | Ellingson | |
| 2015/0122699 | A1* | 5/2015 | Gregerson | F16J 15/104 |
| | | | | 206/711 |
| 2016/0061328 | A1* | 3/2016 | Ritoper | F16J 15/128 |
| | | | | 277/645 |
| 2016/0207438 | A1* | 7/2016 | Ksiezopolski | B60J 10/00 |
| 2017/0311469 | A1 | 10/2017 | Anderson | |
| 2019/0257125 | A1 | 8/2019 | Bloh et al. | |
| 2020/0408304 | A1* | 12/2020 | Ono | F16J 15/062 |

FOREIGN PATENT DOCUMENTS

| | | |
|---|---|---|
| CN | 108093593 A | 5/2018 |
| CN | 108093594 A | 5/2018 |
| CN | 207426478 U | 5/2018 |
| CN | 112203449 A | 1/2021 |
| DE | 102014114261 B4 | 10/2020 |
| GB | 693308 A | 6/1953 |
| WO | 2019/120216 A1 | 6/2019 |

OTHER PUBLICATIONS

AttaBox Industrial Enclosures, a Brand of Robroy Enclosures, Proven Protection by Design, Complete Product Catalog | AE-100, 155 pages, date unknown.

Holland Shielding Systems BV, 6500 Clip-on Gasket Product Sheets, 10 pages, date unknown.

FDB News, "Gasket radius adapter aids installation on control cabinets", www.fdbnews.co.uk/gasket-radius-adapter-aids-installation-on-control-cabinets/, printed Aug. 9, 2021, 2 pages.

Engineering.com, "Making a corner in sheetmetal for a dust tight box", https://www.eng-tips.com/viewthread.cfm?qid=326262, printed Aug. 9, 2021, 3 pages.

* cited by examiner

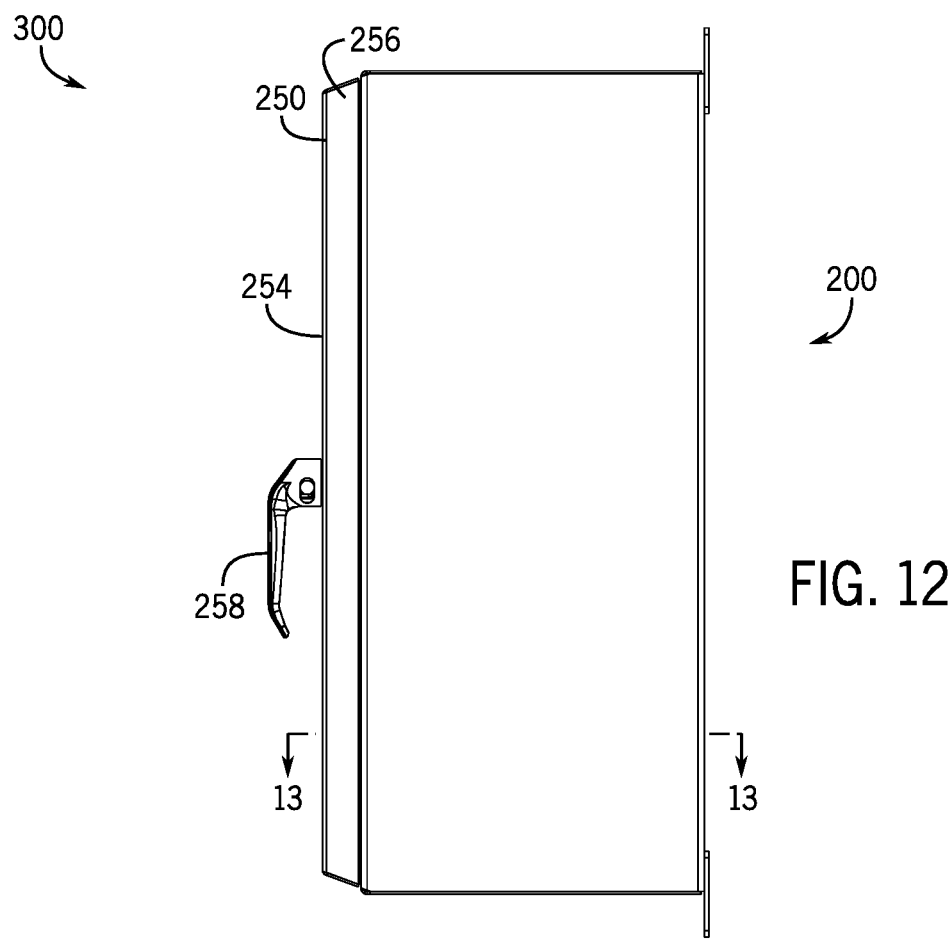
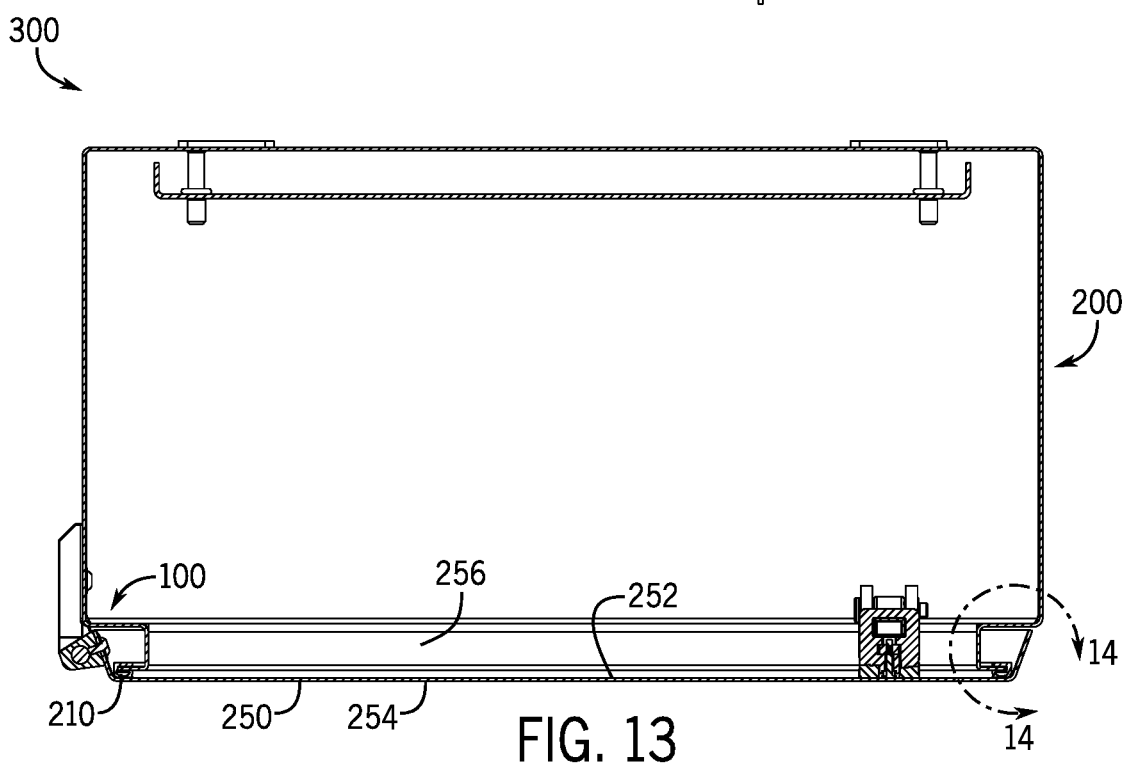
FIG. 12
FIG. 13

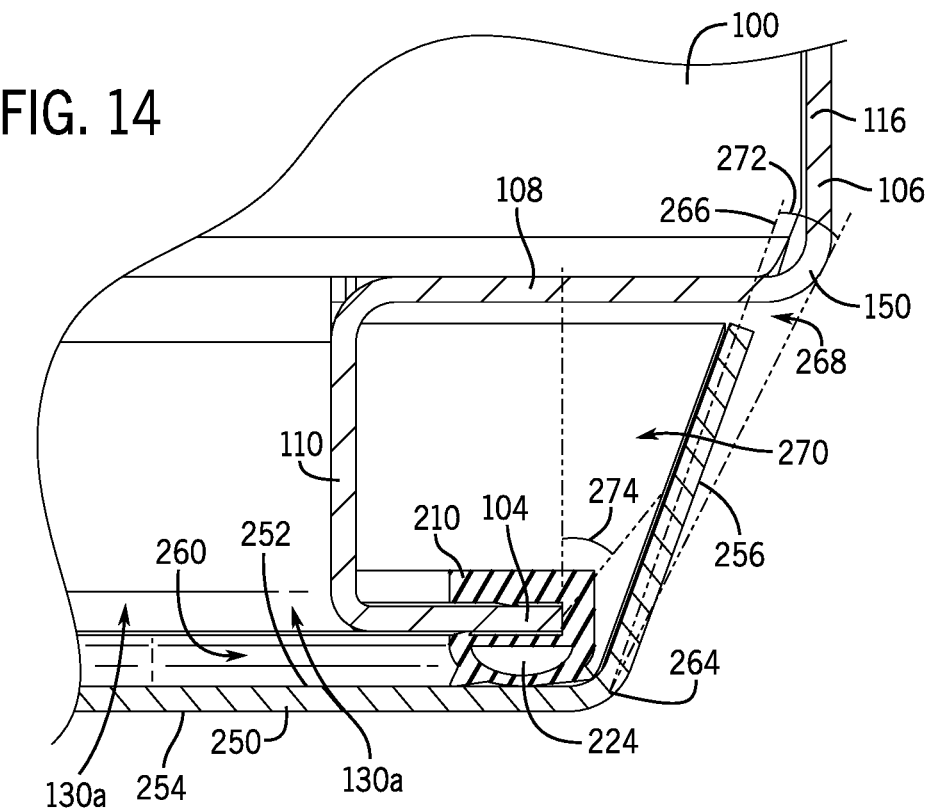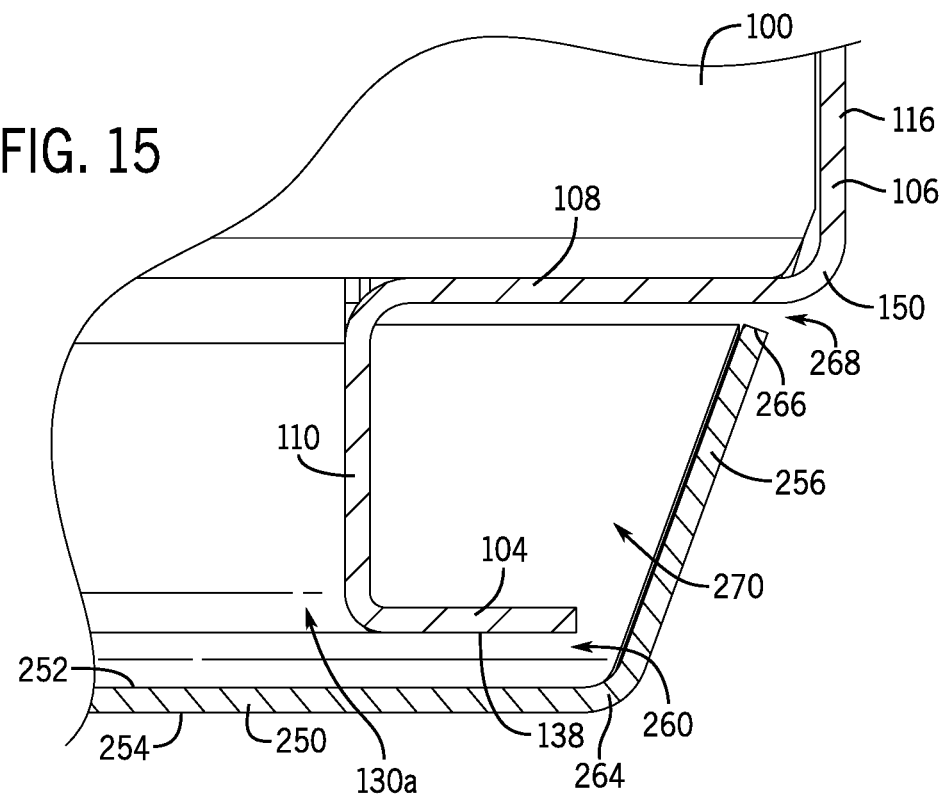

SEALING ARRANGEMENT FOR AN ENCLOSURE

CROSS-REFERENCE TO RELATED APPLICATIONS

This application claims priority to, and hereby incorporates by reference, U.S. Provisional Patent Application No. 63/254,010 on Oct. 8, 2021.

BACKGROUND

Enclosures are often used in various industries to conceal and retain electrical components. In some cases, the electrical components retained within the enclosure are vulnerable to outside contaminants, such as moisture and dust, and, thus, may benefit from or require an enclosure having a sealing arrangement at an opening of the enclosure.

SUMMARY

Some embodiments of the invention provide a sealing arrangement for an enclosure. The sealing arrangement can include a front wall that defines a front opening of the enclosure with an offset extending in a first direction from side walls of the enclosure toward the door opening. A flange can extend from the offset in a second direction away from a back wall of the enclosure. An open hem can extend from the flange, opposite the offset, in a third direction that is opposite the first direction. The open hem can have an inner perimeter and an outer perimeter. The inner perimeter of the open hem can define a door opening of the enclosure aligned with the front opening of the enclosure. The outer perimeter of the open hem can have side sections and radiused corners adapted to secure a continuous gasket to the open hem along the outer perimeter. The radiused corners can include a first radiused corner with a first radius adjacent to a first side section of the side sections. A first ratio of the first radius to a width between the inner and outer perimeters of the open hem along the first side section can be in a range from 11:6 to 12:7.

Some embodiments of the invention can provide an enclosure. The enclosure can include a door and enclosure body. The enclosure body can include a back wall and side walls that define an interior compartment of the enclosure body and a sealing arrangement. The sealing arrangement can include a first wall portion, a second wall portion, a third wall portion, and a gasket. The first wall portion can extend from the side walls, opposite the back wall, in a first direction toward a front opening of the enclosure that is parallel to the back wall. The second wall portion can extend from the first wall portion, opposite the side walls, in a second direction that is perpendicular to the first direction. The third wall portion can extend from the second wall portion, opposite the first wall portion, in a third direction that is parallel to the first direction and can define an open hem. The open hem can include an inner perimeter that defines a door opening for the enclosure and a rectangular outer perimeter with a plurality of radiused corners. The gasket can receive the rectangular outer perimeter of the open hem, including the plurality of radiused corners, to extend continuously around the outer perimeter of the open hem and provide a seal at the door. For each radiused corner of the plurality of radiused corners of the open hem, a ratio of a radius of the radiused corner to a width between the inner and outer perimeters along an adjacent side section of the open hem can be in a range from 11:6 to 12:7.

Some embodiments of the invention can provide a method of manufacturing an enclosure having a sealing arrangement. The method can include forming an enclosure body with a front wall that defines a front opening and includes an offset extending from side walls of the enclosure body toward the front opening in a first direction, forming a flange that extends from the offset in a second direction away from a back wall of the enclosure body, and forming an open hem that extends from the flange, opposite the offset, in a third direction that is opposite the first direction. The open hem can have an inner perimeter that defines a door opening aligned with the front opening, and an outer perimeter that includes side sections and radiused corners adapted to secure a continuous gasket to the open hem along the outer perimeter. A ratio of a first radius of a first of the radiused corners to a width between the inner and outer perimeters along a first side section adjacent to the first radiused corner can be in a range from 11:6 to 12:7. The method can further include mounting a continuous gasket around the outer perimeter of the open hem, including the radiused corners.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 12 is a side view of the enclosure of FIG. 11;

FIG. 13 is a cross-sectional view taken along line 13-13 of FIG. 12;

FIG. 14 is a detailed view of detail 14-14 of FIG. 13; and

FIG. 15 is a detailed view of detail 14-14 of FIG. 13, with the sealing element removed.

DETAILED DESCRIPTION

Figure 1:
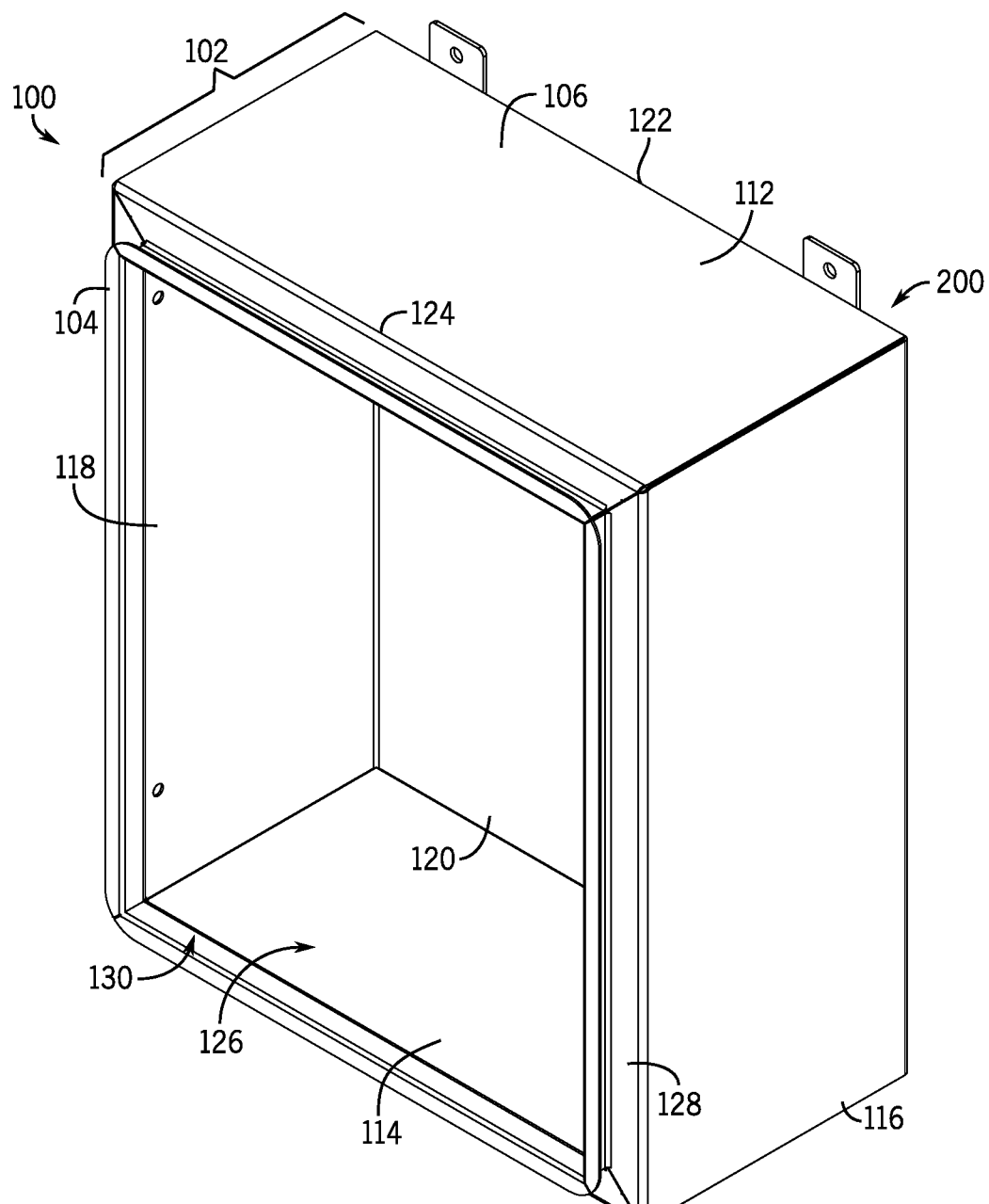
FIG. 1 is a front isometric view of an enclosure having a sealing arrangement according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

Also as used herein, unless otherwise limited or defined, "or" indicates a non-exclusive list of components or operations that can be present in any variety of combinations, rather than an exclusive list of components that are available only as alternatives to each other. For example, a list of A, B, or C indicates options of: A; B; C; A and B; A and C; B and C; and A, B, and C. Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as "either," "one of," "only one of," or "exactly one of."

Also as used herein, unless otherwise limited or defined, "about" refers to a range of values that is within plus or minus 5% of a reference value, inclusive. For example, "about 100" indicates a range of 95 to 105, inclusive. Generally, unless otherwise noted, any references herein to a numerical range are intended to include the endpoints of the range.

Also as used herein, unless otherwise limited or defined, "hem" refers to a portion of a sheet metal body that extends at a non-zero angle relative to another adjacent portion of the sheet metal body. In some cases, a hem may be an open hem, with an air gap between the hem and the adjacent portion of the sheet metal body. In some case, a hem may extend at a non-acute angle from the adjacent portion of the sheet metal body (e.g., at 90 degrees).

Also as used herein, unless otherwise limited or defined, relative to an enclosure door that defines a door entrance area through which components can be passed into or out of the enclosure, "inner" and "outer" refer to positions relative a door entrance along one or more reference lines that extend in plane with the door entrance, from within the door entrance toward a bounding edge thereof. For example, a rectangular door frame of an enclosure entrance can define a generally rectangular entrance area, bounded by the door frame, through which access to the interior of the enclosure is possible. An inner feature in such an arrangement is a feature that is within the entrance area or, as applicable and particularly specified, relatively more toward the entrance area (or a defined point therein) than another feature as projected onto a plane defined by the entrance area. Similarly, an outer feature in such an arrangement is a feature that is outside of the entrance area or, as applicable and particularly specified, relatively more away from entrance area than another feature as projected onto a plane defined by the entrance area. The terms "inward" and "outward" (and derivations thereof) are also used similarly herein.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some of the discussion below describes a sealing arrangement for an enclosure, in which sealing arrangement has radiused corners (i.e., corners that exhibit a radiused inner or outer profile, in contrast to a right-angle or other angled profile), including with particularly beneficial geometric characteristics in some cases. The context and particulars of this discussion are presented as examples only. For example, embodiments of the disclosed invention can be configured in various ways, including with other shapes and arrangements of elements. Similarly, embodiments of the invention can be used for other types of enclosures or for other types of applications other than for sealing arrangements.

As described above, enclosures can retain electrical components, which can be vulnerable to moisture, dust, and other outside contaminants. Accordingly, many enclosures may benefit from or require (e.g., for appropriate ingress protection (IP) rating) a sealing arrangement at an opening of the enclosure. For example, appropriate sealing arrangements at an opening can prevent outside contaminants from entering an interior compartment of the enclosure when the opening is sealed by a door (e.g., a hinged, removable, or other cover).

Many enclosures are comprised of metallic materials, such as sheet metal, which provide durability and strength while being capable of withstanding the conditions of an outside environment or an industrial setting. Correspondingly, common manufacturing processes of sheet metal enclosures result in right angled, sharp edges and right angled corners where two or more sheets of metal are joined, including the edges and corners of sealing arrangements around the opening of the enclosure. However, sharp edges and corners may not provide favorable engagement surfaces for many types of sealing elements, including rubber or plastic gasket strips, which may require a continuous, smooth edge of the sealing arrangement to be installed with minimal noncontinuous seal points and to reduce damage during installation and use.

Conventional sealing elements used in enclosures having sealing arrangements with right angled, sharp edges include, for example, an epoxy foam-in-place gasket applied to the door of the enclosure. However, foam-in-place gaskets can deteriorate over time and after repeated opening of the door. Once the foam-in-place gasket deteriorates, the gasket must be removed from the door. As a result, the original foam-in-place gasket may then need to be replaced with rubber gasket strips in a configuration having mitered corners, as may result in a noncontinuous seal at the mitered corners, or the entire door must be replaced. Alternatively, other sealing arrangements configured to accommodate different sealing elements on the opening of the enclosure body are sometimes used. For example, a hammer-on gasket applied to a vertical flange extending outward from the opening, or gasket strips applied to a hem that extends inward toward the opening. However, hammer-on gaskets are difficult to install and rely on planar contact with the door to provide a seal, which may not occur due to common warping of sheet metal doors. Additionally, inward extending hems can interfere with the installation of components within the enclosure and result in damage to the gasket.

Embodiments of the invention can address these or other issues, including as may allow for continuous rubber or plastic gaskets to be mounted to hems of enclosures (e.g., rather than to doors) with improved sealing and durability as compared to conventional arrangements. For example, in some embodiments, a sealing arrangement can be provided that has a hem extending outward from the opening of the enclosure, with the edge of the hem having radiused corners (i.e., exhibiting a manufactured radius of curvature rather than a flat or angled corner shape). This general sealing arrangement can be beneficial in many contexts. For example, such an arrangement can permit a single gasket strip to be installed along the edge of the hem, resulting in a seal having only a single noncontinuous seal point (or seam) where the two ends of the gasket strip meet. Moreover, because it extends outward, the hem does not reduce the size of the door opening for an enclosure and locates the gasket spaced apart from the door opening. Thus, for example, the gasket is less likely to be damaged while installing components within the enclosure.

FIGS. 1 through 6 illustrate an example sealing arrangement 100 for an enclosure 200 according to an embodiment of the present invention. Referring to FIG. 1, the enclosure 200 has a main body 102 with an open hem 104 that provides a mounting point of the sealing arrangement 100 for a gasket. The main body 102 has a body portion 106, the sealing arrangement includes in particular a first portion 108, a second portion 110, and a third portion provided by the open hem 104 (see FIG. 2). The main portion 106 of the main body 102 defines a top wall 112, a bottom wall 114, a first side wall 116, and a second side wall 118, opposite the first side wall 116, of the enclosure 200 (collectively, all "side" walls). A back wall 120 of the enclosure 200 is included at a second end 122 of the main portion 106, the second end 122 being opposite a first end 124 of the main portion 106. Thus, the side walls 112, 114, 116, 118 and the back wall 120 collectively define (at least partially) an interior compartment 126 of the enclosure 200. In some embodiments, the main portion 106 of the main body 102 can define more than four side walls 112, 114, 116, 118 of the enclosure 200. For example, the main portion 106 of the main body 102 can define five, six, seven, or eight side walls of the enclosure 200.

Figure 2:
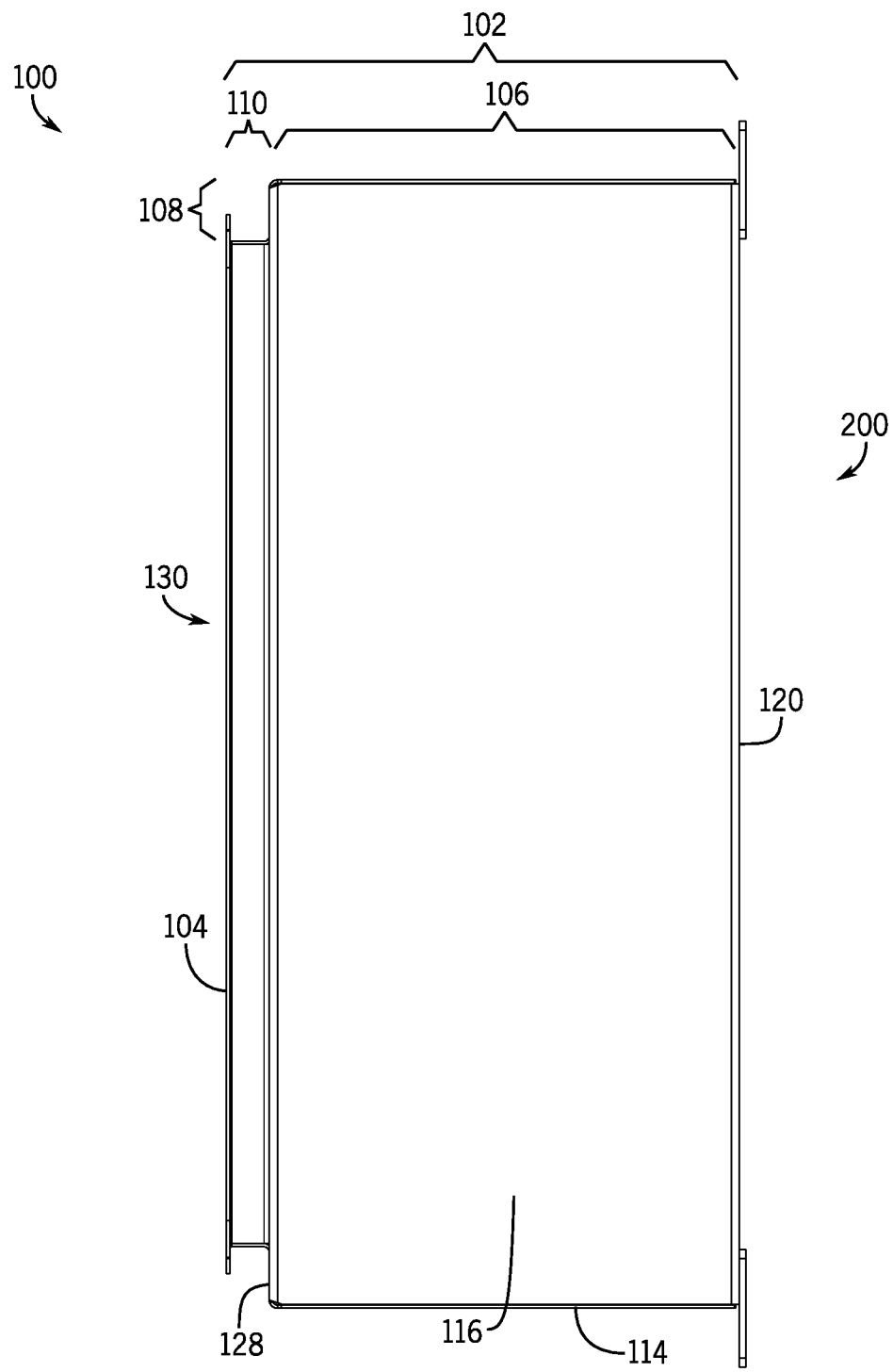
FIG. 2 is a side view of the enclosure of FIG. 1.
Figure 5:
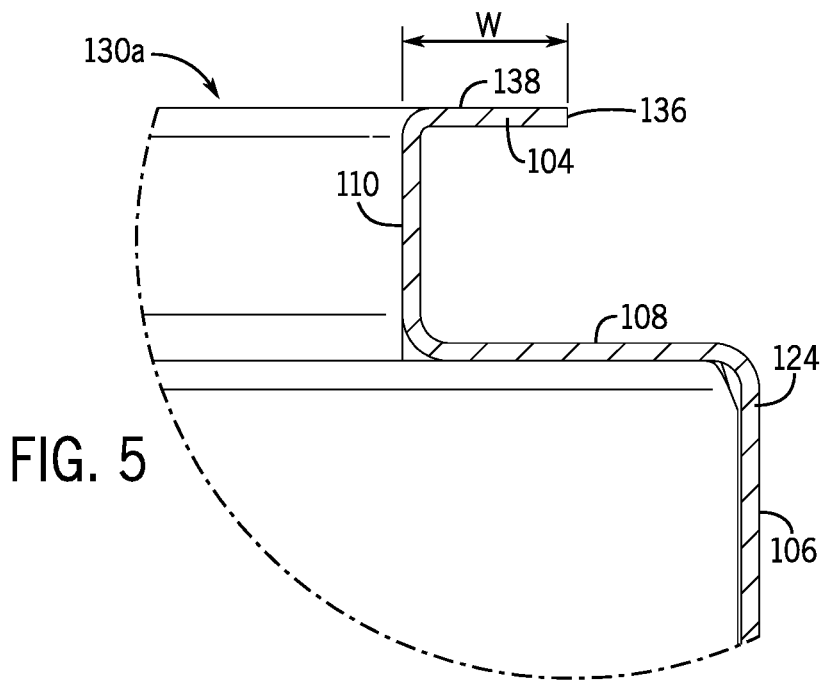
FIG. 5 is a detailed view of detail 5-5 of FIG. 4.

Referring to FIGS. 2 and 5, the first portion 108 of the main body 102 is a wall portion formed as an offset that extends from the first end 124 of the main portion 106 of the main body 102. In the illustrated embodiment, the first portion 108 of the main body 102 is perpendicular to the main portion 106 and parallel to the back wall 120 of the enclosure 200. In some embodiments, the first portion 108 of the sealing arrangement 100 and the back wall 120 of the enclosure 200 can be otherwise angled relative to one other. in the illustrated embodiment, the first portion 108 of the main body 102 defines a front wall 128 of the enclosure 200, which defines a front opening 130 into the interior compartment 126 of the enclosure 200.

The second portion 110 of the sealing arrangement 100 is formed as a flange that extends from the first portion 108. In the illustrated embodiment, the second portion 110 of the main body 102 is perpendicular to the first portion 108 and the back wall 120 of the enclosure 200 and extends forwardly away from the back wall 120. In some embodiments, the first and second portions 108, 110 of the main body 102 can be otherwise angled relative to one other.

Figure 3:
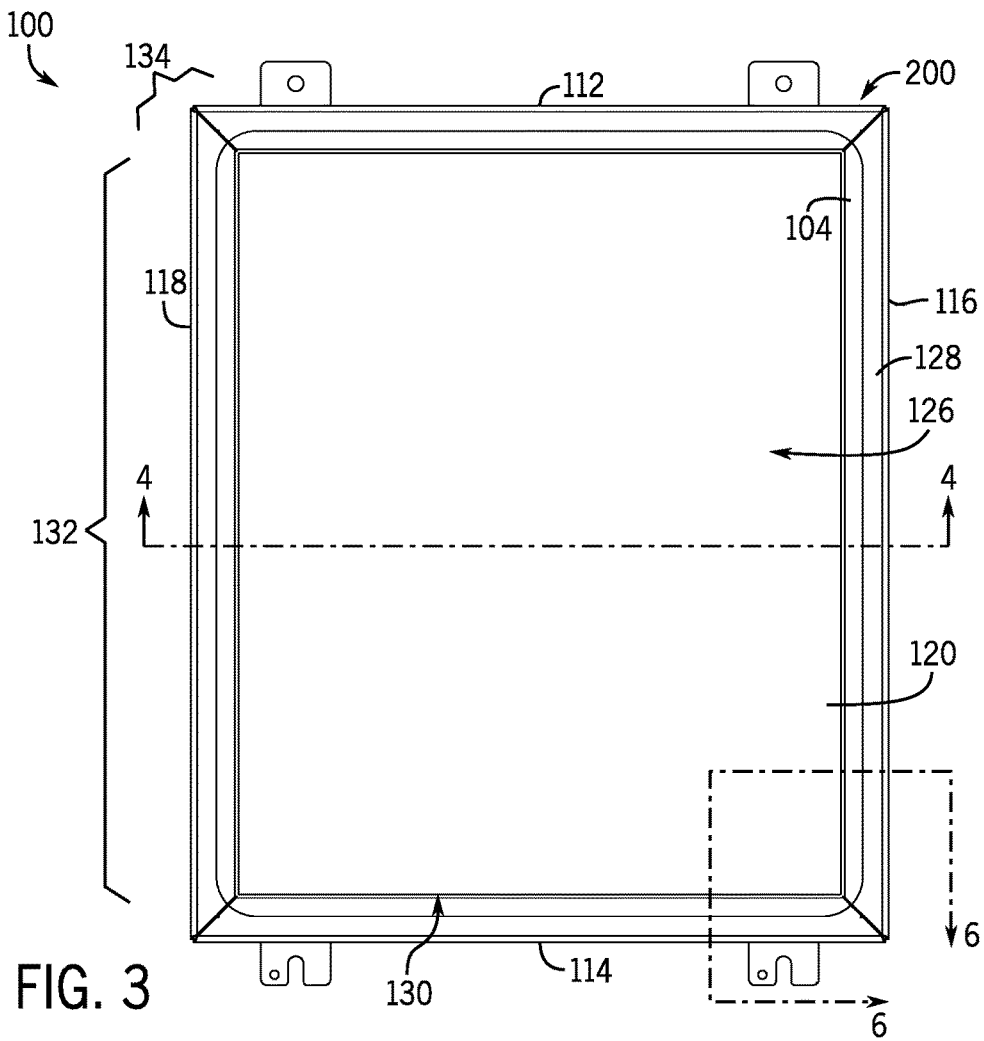
FIG. 3 is a front view of the enclosure of FIG. 1.

The open hem 104 (and third portion of the sealing arrangement 100) extends from the second portion 110 toward the main portion 106 of the main body 102. In the illustrated embodiment, the open hem 104 is parallel to the first portion 108 of the main body 102. In some embodiments, the open hem 104 and the first portion 108 of the main body 102 can be angled relative to each other. Referring to FIG. 3, in particular, the open hem 104 has side sections 132 which correspond to the side walls 112, 114, 116, 118 of the enclosure 200. Corner sections 134 of the open hem 104 are located between the side sections 132. In the illustrated embodiment, the open hem 104 has four side sections 132, each being perpendicular to adjacent side sections 132, and four corner sections 134. In some embodiments, the open hem 104 can have more than four side sections 132 (and corresponding corner sections 134), including if the main portion 106 of the main body 102 defines more than four side walls of the enclosure 200.

In particular, the sealing arrangement 100 can be formed by bending operations. For example, bending operations on a larger piece of sheet metal (using known sheet-bending equipment) can provide the overall profile shown in FIG. 1 or other relevant enclosure profiles. Select welds or other joining techniques can then be applied along the various seams, including along radiused corners as needed. Notably, the particular configurations discussed herein, including particular ratios or angular configurations, can allow for efficient and repeatable manufacturing of an enclosure in this way, while still maintaining reliably high quality connections along various seams and high quality sealing for the finished product.

Figure 4:
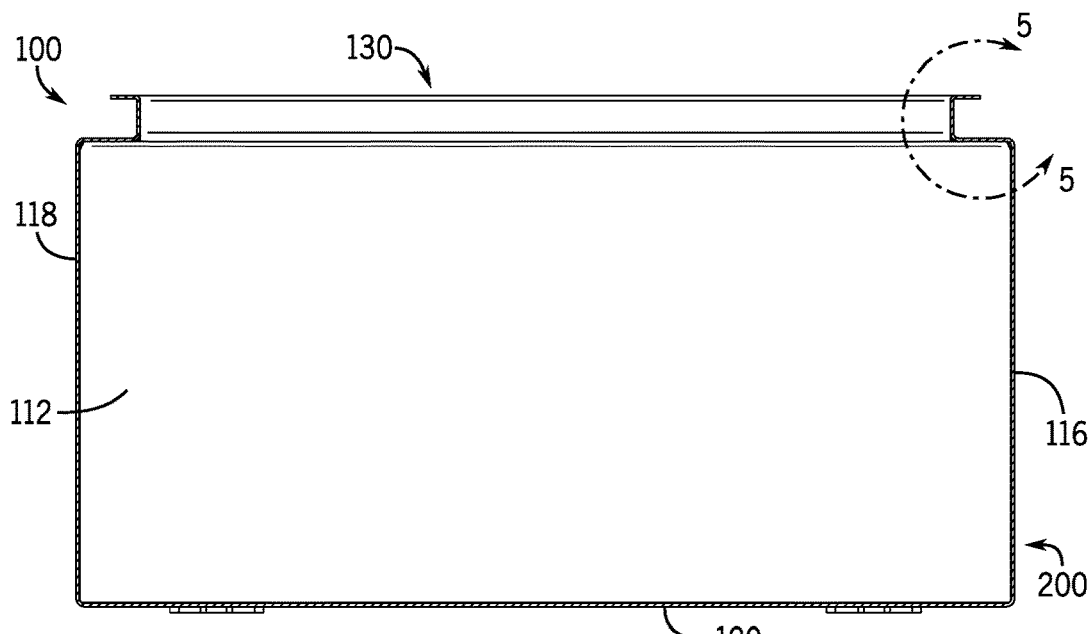
FIG. 4 is a cross-sectional view of the enclosure taken along line 4-4 of FIG. 3.

FIGS. 4 and 5 show the main body 102 and the open hem 104 in a sectional view. The open hem 104 has a width W at the side sections 132, which is less than a width of the first portion 108 of the main body 102. Thus, an edge 136 of the open hem 104 extends from the second portion 110 toward, but not past, the main portion 106 of the main body 102, as viewed from a front elevation. In other embodiments, an open hem may extend by different distances.

Figure 6:
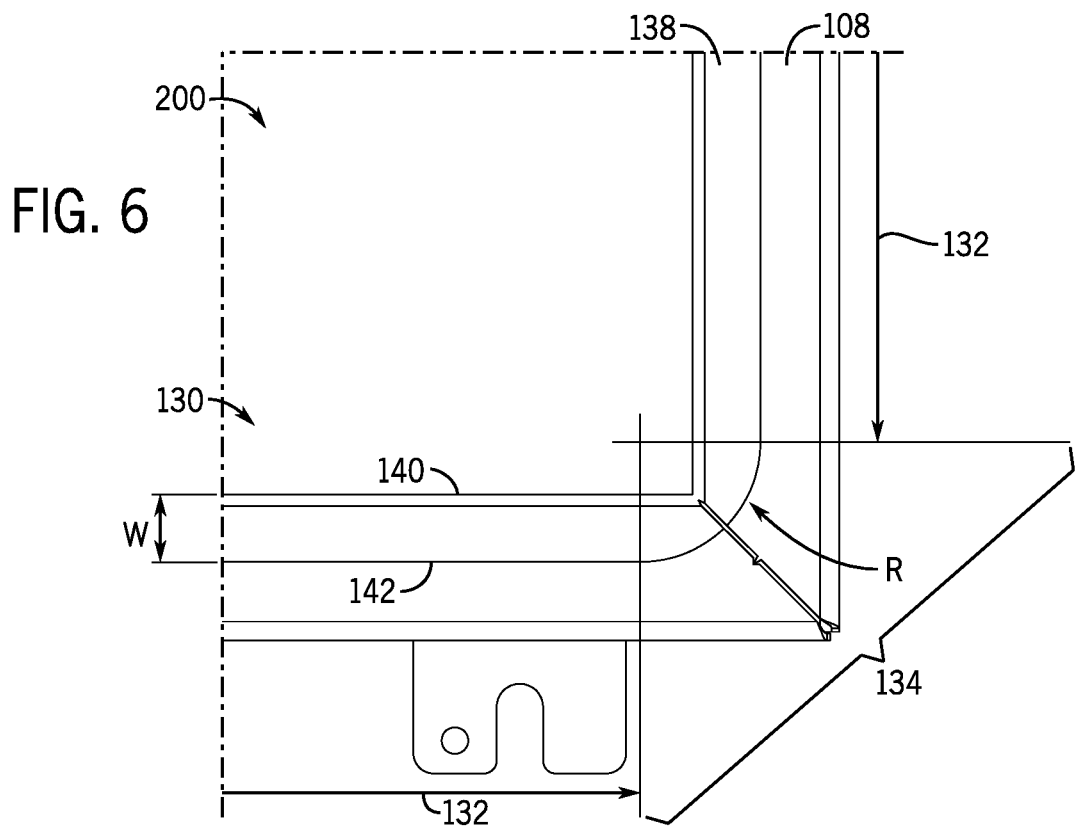
FIG. 6 is a detailed view of detail 6-6 of FIG. 3.

FIG. 6 shows the open hem 104 in greater detail. The open hem 104 has a front surface 138 with an inner perimeter 140 and an outer perimeter 142. The inner perimeter 140 is adjacent to the opening 130 and defines, in particular, a door opening 130a (see FIG. 5) at a front edge of the sealing arrangement 100 and the enclosure 200. The outer perimeter 142 defines the outer profile of the edge 136 of the open hem 104 (i.e., the outer profile relative to a radial reference frame with a center within the door opening 130a). The outer perimeter 142 of the front surface 138 has a radius R at the corner sections 134 to provide radiused corners. In the illustrated embodiment, the inner perimeter 140 has a 90 degree angle at the corner sections 134. In some embodiments, the inner perimeter 140 can have an angle greater or less than 90 degrees or a radius different than or equal to the radius R of the outer perimeter 142 at the corner sections 134 of the open hem 104.

The curvature generally provided by the radius R can result in more reliable and durable engagement with a gasket or other sealing element to seal the enclosure 200. In some particularly beneficial embodiments, to provide an open hem 104 that is configured to receive a gasket 210 (see FIGS. 7 through 14), the radius R of the outer perimeter 142 of the front surface 138 at the corner portions 134 can be dimensioned dependent on the width W of the open hem 104 at the adjacent side sections 132, and vice versa (i.e., as measured either immediately adjacent to the radiused corner or as an average of an entire length of the front surface 138 between relevant radiused corners). For example, in the illustrated embodiment, a particularly beneficial ratio between the radius R of the outer perimeter 142 of the front surface 138 at the corner sections 134 and the width W of the open hem 104 at the side sections 132, adjacent to the corner sections 134 is in the range from 11:6 to 12:7. This range of ratios, and a ratio in particular of about 9:5 (i.e., within 7% or less of 9:5, inclusive), has been found to provide an open hem 104 having a front surface 138 that can receive a gasket (e.g., a gasket 210, as shown in FIG. 7) with substantially reduced likelihood of the gasket tearing or bunching along the open hem 104.

In the illustrated embodiment, the inner and outer perimeters 140, 142 are parallel to each other along the side sections 132 of the open hem 104, and each of the side sections 132 have the same width W. In some embodiments, the inner and outer perimeters 140, 142 can have non-parallel profiles along the side sections 132 of the open hem 104.

Figure 7:
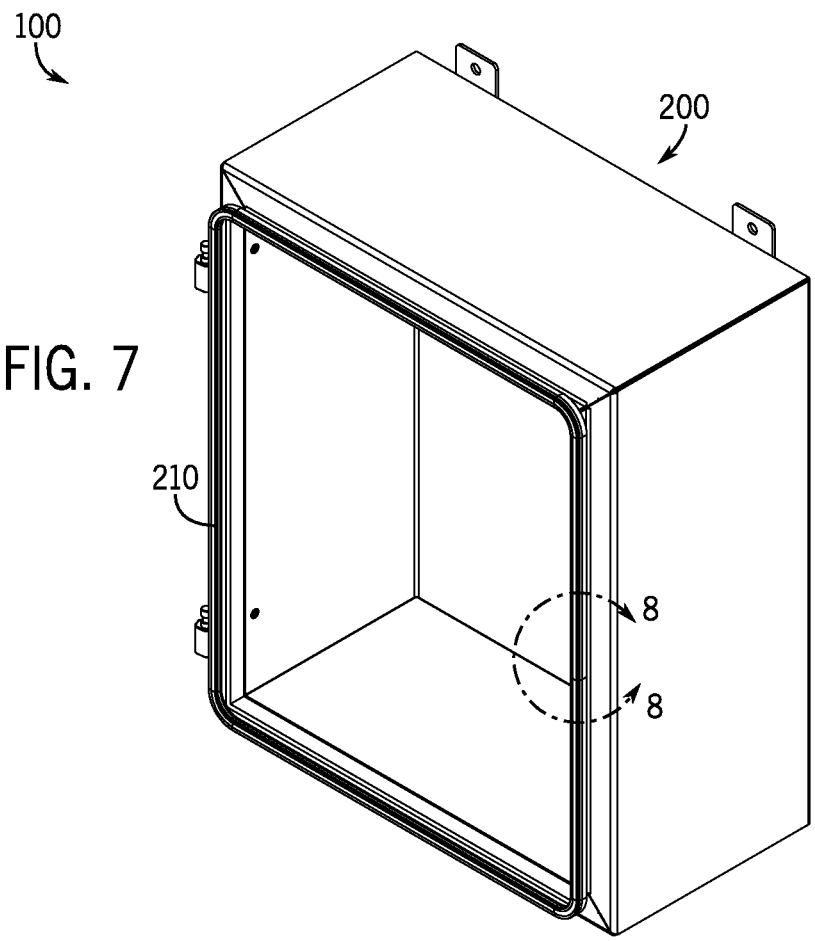
FIG. 7 is a front isometric view of the enclosure of FIG. 1 including a sealing element.
Figure 8:
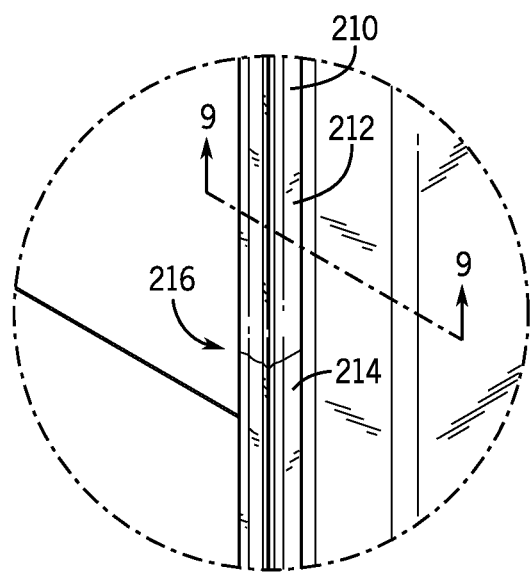
FIG. 8 is a detailed view of detail 8-8 of FIG. 7.
Figure 9:
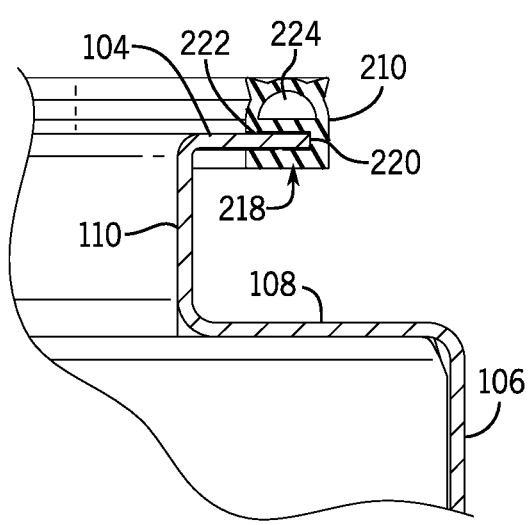
FIG. 9 is a cross-sectional view of the sealing arrangement of the enclosure taken along line 9-9 of FIG. 8.

FIGS. 7 through 9 illustrate a gasket 210 disposed on the sealing arrangement 100 of the enclosure 200, according to an embodiment of the invention. Referring to FIGS. 7 and 8, the gasket 210 is disposed around the continuous edge 136 (i.e., as defined by the outer perimeter 143) of the open hem 104 having radiused corners (i.e., corner sections 132). In the illustrated embodiment, the gasket 210 is a single gasket strip having a first end 212 and a second end 214 that contact each other along one of the side sections 132. Thus, the gasket 210 can provide a seal having only one noncontinuous seal point 216 located where the ends 212, 214 of the gasket 210 meet. Further, in some embodiments, the ends 212, 214 can be joined (e.g., adhered) together, so that a fully continuous seal can be provided, with only a single potentially weak connection point (e.g., also at point 216). In the illustrated embodiment, the first and second ends 212, 214 (and thus the noncontinuous seal point 216) of the gasket 210 are located on the side section 132 of the open hem 104 corresponding to the bottom wall 114 of the enclosure 200. In other embodiments, the ends 212, 214 of the gasket 210 can be located on any one of the side sections 132 of the open hem 104. In some embodiments, a gasket can be comprised of two or more gasket strips, and, thus can have four or more ends and two or more noncontinuous seal points 216.

Referring to FIG. 9, a channel 218 of the gasket 210 receives a portion of the open hem 104, such that the edge 136 of the open hem 104 contacts an inner wall 220 of the channel 218 of the gasket 210, including continuously along the radiused corners. In the illustrated example, the channel 218 of the gasket 210 has gripping features 222 configured to secure the gasket 210 onto the open hem 104. Other gripping features 222 or securing means known in the art can additionally (or alternatively) be utilized. As discussed in greater detail herein, a bulb 224 is included on a top surface of the gasket 210 that can be configured to compress when a door (not shown in FIG. 8) of the enclosure contacts the gasket 210 (see, e.g., FIGS. 13 and 15).

Figure 10:
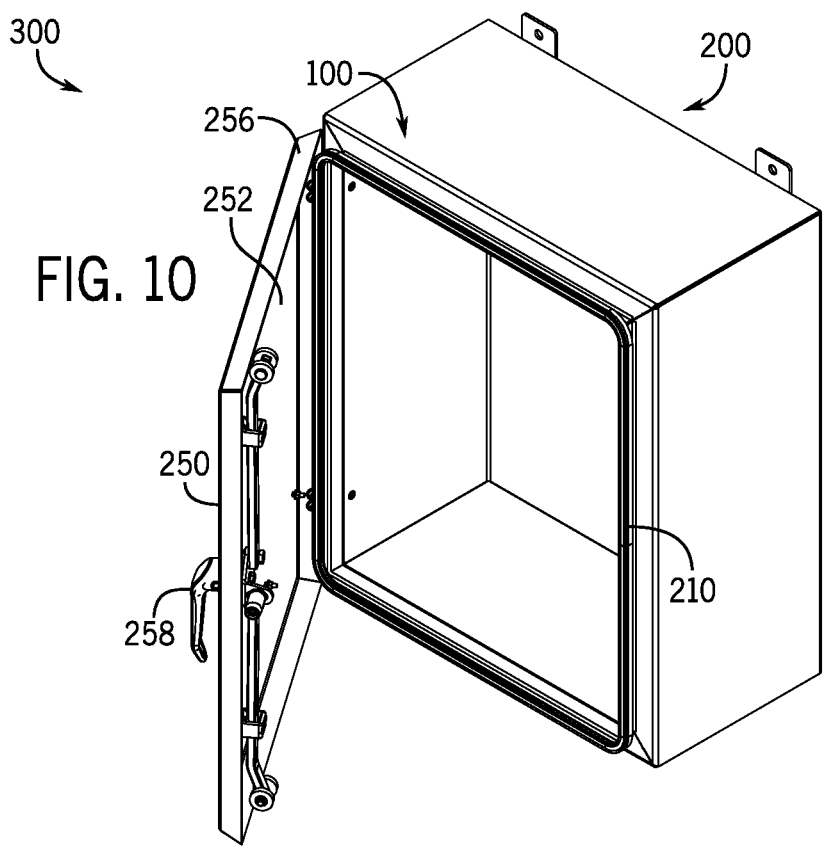
FIG. 10 is a front isometric view of an enclosure including an enclosure body having a sealing arrangement and a cover, with the cover in an open configuration, according to an embodiment of the invention.
Figure 11:
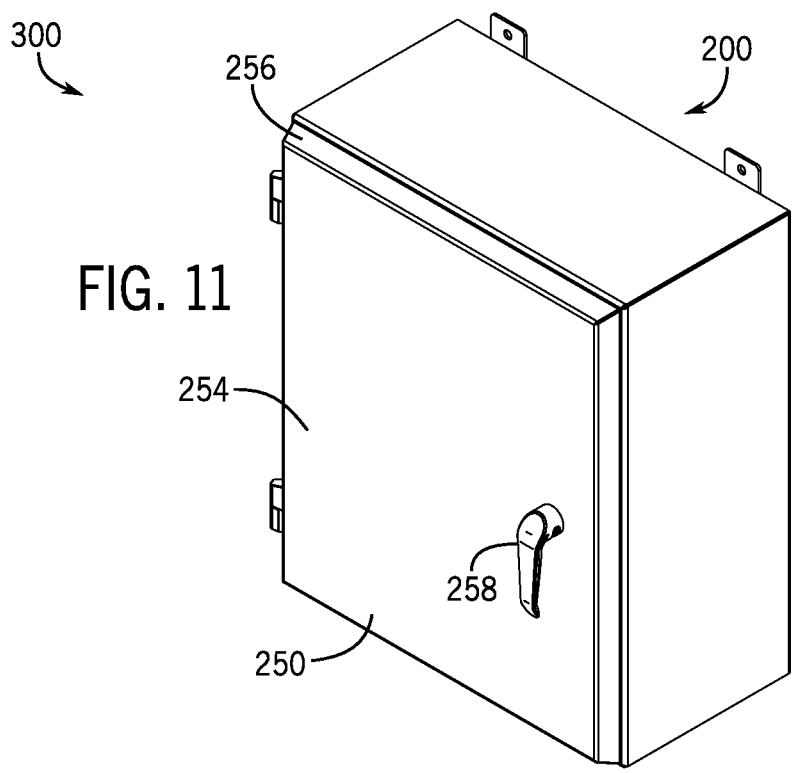
FIG. 11 is a front isometric view of the enclosure of FIG. 10, with the cover in a closed configuration.

FIGS. 10 through 15 illustrate an enclosure assembly 300 including the enclosure 200, with the sealing arrangement 100 and the gasket 210, and a door 250, according to an embodiment of the invention. Referring to FIGS. 10 through 12, the enclosure assembly 300 is shown with the door 250 in an open configuration (see FIG. 10) and a closed configuration (see FIGS. 11 and 12). In the illustrated example, the door 250 is removably attached to the second side wall 118 of the enclosure 200 and can rotate relative to the second side wall 118 toward the opening 130 of the enclosure 200. In other embodiments, the door 250 can be removably attached to the any of side walls 112, 114, 116, 118 of the enclosure 200 and may not necessarily be a hinged door (e.g., may be a removable panel). The door 250 includes an inner (or first) surface 252 and an outer (or second) surface 254, opposite the inner surface 252. An angled rim 256 is provided along a portion of an outer perimeter of the door 250 such that the outer perimeter of the door 250 angles inwardly relative to the outer surface 254. For example, as shown in FIGS. 10 and 11, the angled rim 256 can extend from corresponding bends along an entire outer perimeter of the door 250. A latch 258 can be included to removably secure the door 250 to the enclosure 200 in the closed configuration (see FIGS. 11 and 12) and, in some cases, help to compress the gasket 210 to form a seal.

Referring to FIGS. 13 through 15, the enclosure assembly 300 in the closed configuration is shown in a section view. In the closed configuration, with the gasket 210 removed (as shown in FIG. 15), a first door gap 260 between the front surface 138 of the open hem 104 of the enclosure 100 and the inner surface 252 of the door 250 is included. In the illustrated example, the first door gap 260 has a thickness less than a thickness of the gasket 210 with the bulb 224 in an uncompressed state (e.g., as shown in FIG. 9).

Thus, when the door 250 of the enclosure assembly 300 is in the closed configuration, with the gasket 210 installed (as shown in FIG. 14), the inner surface 252 of the door 250 contacts the gasket 210 and compresses the bulb 224 to a compressed state (as shown in FIG. 14), such that a seal is formed with the door 250 around the sealing arrangement 100. More specifically, the bulb 224 of the gasket 210 contacts the inner surface 252 of the door 250 proximate to a bend 264 of the angled rim 256 (and in some cases at the bend 264) such that the seal is formed with the door 250 inwardly of the angled rim 256. Further, a lip 266 of the angled rim 256 extends from the bend 264 toward the first portion 108 of the enclosure 100 as well as from the bend 264 outwardly toward the main portion 106 (i.e., the first side wall 116 as illustrated) of the enclosure 100. Accordingly, the lip 266 of the door 250 extends substantially toward a front outer edge (or bend) 150 of the enclosure 100 that is located between the main portion 106 (i.e., the side walls) and the first portion 108 of the enclosure 100. In other words, the lip 266 extends toward the edge of the enclosure that is defined by the bend 150 in a direction that is within ±7.5 degrees of intersecting the edge (see, e.g., angle 272 in FIG. 14), inclusive, as can provide improved protection against ingress of material behind the door 250.

Similarly, some examples can include combinations of hem, offset, and flange dimensions that can beneficially orient a gasket relative to an angled cover lip. In some cases, a slope from a free edge of an open hem (e.g. as receives the gasket 210 in FIG. 14), to an edge of an enclosure (e.g., as defined by the bend 150 in FIG. 14) can beneficially be in between about 0.7 and about 0.8, and more particularly about 0.76. For example, as illustrated in FIG. 14, a slope can be defined by a ratio between (a) a difference between the widths of the offset 108 and the open hem 104 (i.e., measured left to right in FIG. 14), and (b) the width of the flange 110 (i.e., measured top to bottom in FIG. 14). Thus, as represented by angle 274 in FIG. 14, a particularly angled slope can be provided to provide optimal clearance and sealing for the angled rim 256 (e.g., with an angle of about 37.5 degrees, corresponding to the optimized example noted above).

In the illustrated embodiment, the lip 266 is disposed at a distance from the first portion 108 of the enclosure 100 and forms a second door gap 268 that opens into a door cavity 270 defined by the inner surface 252 of the door 250 along the angled rim 256 and the open hem 104, the first portion 108, and the second portion 110 of the enclosure 100. In some embodiments, the lip 266 can be configured to form a second door seal with the first portion 108 of the enclosure 100 (such as, e.g., a second gasket arranged along the lip 266 or along the first portion 108). In other embodiments, gaskets having different configurations (e.g., different bulb shapes) and/or doors having different configurations can be used in similar enclosure assemblies.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

For example, with reference to FIGS. 7 through 9, some embodiments can include a method of manufacturing the enclosure 200 having the sealing arrangement 100. The method including forming the enclosure 200 with the main body 102 having the second portion 110 extending outward from the opening 130 of the enclosure 200 and an open hem 104 extending perpendicular from the second portion 110 of the main body 102 in a direction opposite the opening 130. The open hem 104 in particular can be formed to a radiused profile (e.g., with the radius R) at the corner sections 134 of the open hem 104. After forming the enclosure 200, the gasket 210 can be mounted around the edge 136 of the open hem 104.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A sealing arrangement for an enclosure comprising:
a front wall that defines a front opening of the enclosure and includes an offset extending in a first direction from side walls of the enclosure toward the front opening;
a flange extending from the offset in a second direction away from a back wall of the enclosure; and
an open hem extending from the flange, opposite the offset, in a third direction that is opposite the first direction,
wherein the open hem has an inner perimeter and an outer perimeter, the inner perimeter defines a door opening of the enclosure aligned with the front opening of the enclosure, and the outer perimeter includes side sections and radiused corners adapted to secure a continuous gasket to the open hem along the outer perimeter, the radiused corners including a first radiused corner with a first radius adjacent a first side section of the side sections; and
wherein a first ratio of (i) the first radius to (ii) a width between the inner and outer perimeters along the first side section is in a range from 11:6 to 12:7.

2. The sealing arrangement of claim 1, wherein the first ratio is about 9:5.

3. The sealing arrangement of claim 1, wherein the first radiused corner is adjacent a second side section of the outer perimeter; and
wherein a second ratio of (i) the first radius to (ii) a second width between the inner and outer perimeters along the second side section is in a range from 11:6 to 12:7.

4. The sealing arrangement of claim 3, wherein the first ratio is about 9:5 and the second ratio is about 9:5.

5. The sealing arrangement of claim 1, wherein the open hem has four side sections corresponding to the side walls of the enclosure, and four corner sections corresponding to convergence of adjacent sets of the side sections, and
wherein the inner and outer perimeters of the open hem are parallel along the side sections of the open hem.

6. The sealing arrangement of claim 1, wherein the inner perimeter defines a 90 degree angle adjacent to one or more of the radiused corners of the outer perimeter.

7. The sealing arrangement of claim 1, further comprising:
a door of the enclosure;
wherein the outer perimeter of the open hem secures the continuous gasket with the continuous gasket proximate to an angled rim of the door.

8. The sealing arrangement of claim 7, wherein the continuous gasket contacts the door at a bend on the door that defines the angled rim.

9. The sealing arrangement of claim 8, wherein, from the bend, the angled rim angles away from the continuous gasket and substantially toward an outer edge of the offset.

10. The sealing arrangement of claim 9, wherein the outer edge of the offset defines a front outer edge of the enclosure.

11. The sealing arrangement of claim 1, wherein a third ratio of (iii) a difference between a length of the offset in the first direction and a length of the open hem in the third direction to (iv) a length of the flange in the second direction is between about 0.7 and about 0.8.

12. The sealing arrangement of claim 11, further comprising:
a door of the enclosure, including an angled rim defined by a bend;
wherein the outer perimeter of the open hem is received within the continuous gasket to secure the continuous gasket in contact with the bend.

13. An enclosure comprising:
a door; and
an enclosure body including:
a back wall and side walls that define an interior compartment of the enclosure body; and
a sealing arrangement including:
a first wall portion that extends from the side walls, opposite the back wall, in a first direction toward a front opening of the enclosure, the first direction being parallel to the back wall;
a second wall portion that extends from the first wall portion, opposite the side walls, in a second direction that is perpendicular to the first direction;
a third wall portion that extends from the second wall portion, opposite the first wall portion, in a third direction that is parallel to the first direction, the third wall portion defining an open hem that includes: an inner perimeter that defines a door opening for the enclosure, and a rectangular outer perimeter with a plurality of radiused corners; and
a gasket that receives the rectangular outer perimeter of the open hem, including the plurality of radiused corners, to extend continuously around the outer perimeter of the open hem and provide a seal at the door;
wherein, for each radiused corner of the plurality of radiused corners, a ratio of (i) a radius of the radiused corner to (ii) a width between the inner and outer perimeters along an adjacent side section of the open hem is in a range from 11:6 to 12:7.

14. The enclosure of claim 12, wherein, with the door in a closed position, a surface of the door contacts and compresses the gasket of the sealing arrangement to provide the seal with the front surface of the open hem along each of the plurality of radiused corners.

15. The enclosure of claim 14, wherein the ratio is about 9:5.

16. The enclosure of claim 13, wherein the door includes bends that define an angled rim around an outer perimeter of the door; and
wherein the gasket contacts the door along the bends to provide the seal.

17. The enclosure of claim 16, wherein the first wall portion extends from junctions with the side walls that define outer front edges of the enclosure; and
wherein, adjacent to the radiused corner, the angled rim angles from the bend away from the gasket to extend toward the front outer edges of the enclosure in a direction that is within ±7.5 degrees of intersecting the front outer edges.

18. The enclosure of claim 17, wherein, adjacent to the radiused corners, a second ratio of (iii) a distance between the rectangular outer perimeter and the front outer edges in the third direction to (iv) a length of the second wall portion in the second direction is between about 0.7 and about 0.8.

19. A method of manufacturing a sealing arrangement of an enclosure, the method comprising:
forming an enclosure body with a front wall that defines a front opening, wherein the front wall includes an offset extending from side walls of the enclosure body toward the front opening in a first direction;
forming a flange that extends from the offset in a second direction away from a back wall of the enclosure body;
forming an open hem that extends from the flange, opposite the offset, in a third direction that is opposite the first direction, wherein the open hem has an inner perimeter that defines a door opening aligned with the front opening, and an outer perimeter that includes side sections and radiused corners adapted to secure a continuous gasket to the open hem along the outer perimeter, and wherein a first ratio of (i) a first radius of a first of the radiused corners to (ii) a width between the inner and outer perimeters along a first side section adjacent to the first radiused corner is in a range from 11:6 to 12:7; and
mounting a continuous gasket around the outer perimeter of the open hem, including the radiused corners.

20. The method of claim 19, wherein forming the front wall, the flange, and the open hem includes bending sheet metal portions that extend from the side walls to provide the front wall, the flange, and the open hem.

* * * * *